(12) United States Patent
Goldstein (10) Patent No.: US 6,757,717 B1
(45) Date of Patent: Jun. 29, 2004

(54) SYSTEM AND METHOD FOR DATA ACCESS

(75) Inventor: Leonid Goldstein, Herzlia (IL)

(73) Assignee: ProxyConn, Inc., Irvine, CA (US)

( * ) Notice: Subject to any disclaimer, the term of this patent is extended or adjusted under 35 U.S.C. 154(b) by 0 days.

(21) Appl. No.: 09/398,007

(22) Filed: Sep. 16, 1999

(51) Int. Cl.[7] .............................................. G06F 15/16
(52) U.S. Cl. ............................. 709/217; 707/1; 707/10; 709/203; 709/225; 709/229
(58) Field of Search ................................. 709/217, 203, 709/229, 225; 707/10, 1

(56) References Cited

U.S. PATENT DOCUMENTS

| | | | |
|---|---|---|---|
| 4,897,781 A | | 1/1990 | Chang et al. |
| 5,384,565 A | | 1/1995 | Gregory |
| 5,682,514 A | * | 10/1997 | Yohe et al. ............... 707/1 |
| 5,732,265 A | | 3/1998 | Dewitt et al. |
| 5,835,943 A | | 11/1998 | Yohe et al. |
| 5,852,717 A | | 12/1998 | Bhide et al. |
| 5,864,837 A | | 1/1999 | Maimone |
| 5,878,213 A | * | 3/1999 | Bittinger et al. ............ 707/10 |
| 5,909,569 A | * | 6/1999 | Housel et al. ............. 707/10 |
| 5,919,247 A | * | 7/1999 | Van Hoff et al. .......... 709/217 |
| 5,924,116 A | | 7/1999 | Aggarwal et al. |
| 5,931,947 A | * | 8/1999 | Burns et al. ............... 713/201 |
| 5,978,791 A | | 11/1999 | Farber et al. |
| 6,003,087 A | * | 12/1999 | Housel et al. ............. 707/203 |
| 6,006,034 A | | 12/1999 | Heath et al. |
| 6,012,085 A | | 1/2000 | Yohe et al. |
| 6,021,491 A | * | 2/2000 | Renaud ..................... 713/179 |
| 6,073,173 A | * | 6/2000 | Bittinger et al. ........... 707/513 |
| 6,085,249 A | * | 7/2000 | Wang et al. ............... 709/229 |
| 6,101,543 A | * | 8/2000 | Alden et al. ............... 709/229 |
| 6,122,637 A | * | 9/2000 | Yohe et al. ................ 709/204 |
| 6,134,583 A | * | 10/2000 | Herriot ...................... 709/217 |
| 6,148,340 A | * | 11/2000 | Bittinger et al. ........... 709/203 |
| 6,256,664 B1 | * | 7/2001 | Donoho et al. ............ 709/204 |
| 6,279,041 B1 | * | 8/2001 | Baber et al. ............... 709/232 |

OTHER PUBLICATIONS

RFC2068: Hypertext Transfer Protocol—HTTP/1.1, Jan. 1997, pp. 9–12, 29–35, 70–94, 101–138.
RFC791: Internet Protocol Darpa Internet Program Protocol Specification, Sep. 1981, pp. 3, 11–14, 26.
RFC761: DOD Standard Transmission Control Protocol, Jan. 1980, pp.4, 15–17.
RFC1826: IP Authentication Header, Aug. 1995, pp. 1–10.
RFC1864: The Content–MD5 Header Field, Oct. 1995, pp.1–2.
RFC1321: The MD5 Message–Digest Algorithm, Apr. 1992, pp. 1–21.
Dave Fogle, Ethernet Frame Types, article from Feb. 1996 issue of LAN Magazine/Network Magazine, pp. 1–4.
W. Richard Stevens, TCP/IP Illustrated, vol. 1, 1994, pp. 33–37, 143–147, 223–228.

\* cited by examiner

*Primary Examiner*—Jack B. Harvey
*Assistant Examiner*—Hai V. Nguyen
(74) *Attorney, Agent, or Firm*—J. D. Harriman, II, Esq.; Coudert Brothers LLP (57) ABSTRACT

The invention provides a system for data access in a packet-switched network, including a sender/computer including an operating unit, a first memory, a permanent storage memory and a processor and a remote receiver/computer including an operating unit, a first memory, a permanent storage memory and a processor, the sender/computer and the receiver/computer communicating through the network; the sender/computer further including device for calculating digital digests on data; the receiver/computer further including a network cache memory and device for calculating digital digests on data in the network cache memory; and the receiver/computer and/or the sender/computer including device for comparison between digital digests. The invention also provides a method and apparatus for increased data access in a packet-switched network.

34 Claims, 9 Drawing Sheets

SYSTEM AND METHOD FOR DATA ACCESS

RELATED APPLICATION

This application claims priority and is entitled to the filing date of Israeli application Ser. No. 126292 filed Sep. 18, 1998, and entitled "System And Method For Data Access," and which describes the same invention as defined herein.

FIELD OF THE INVENTION

The present invention relates to data access in networks. Specifically, the invention is concerned with a method, system and apparatus for increasing the speed of data accessing in communication networks.

BACKGROUND OF THE INVENTION

Figure 1:
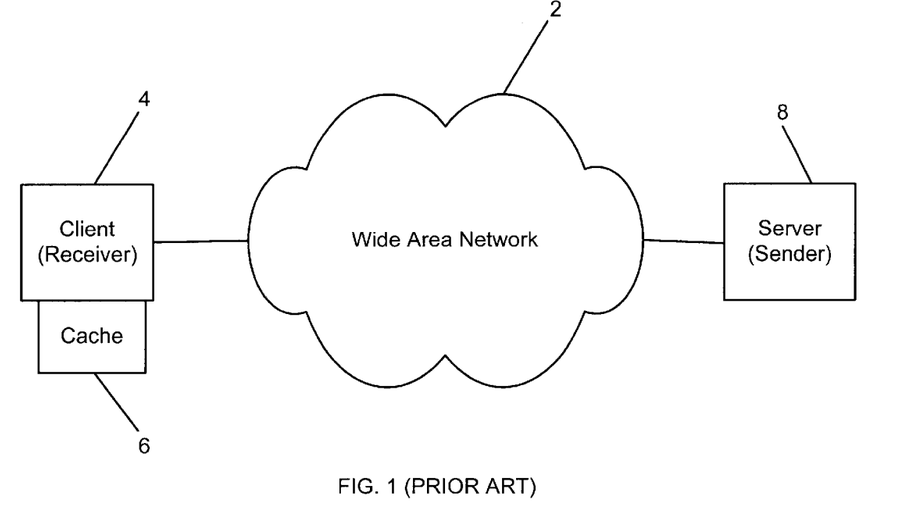
FIG. 1 illustrates a prior art wide-area network.
Figure 2:
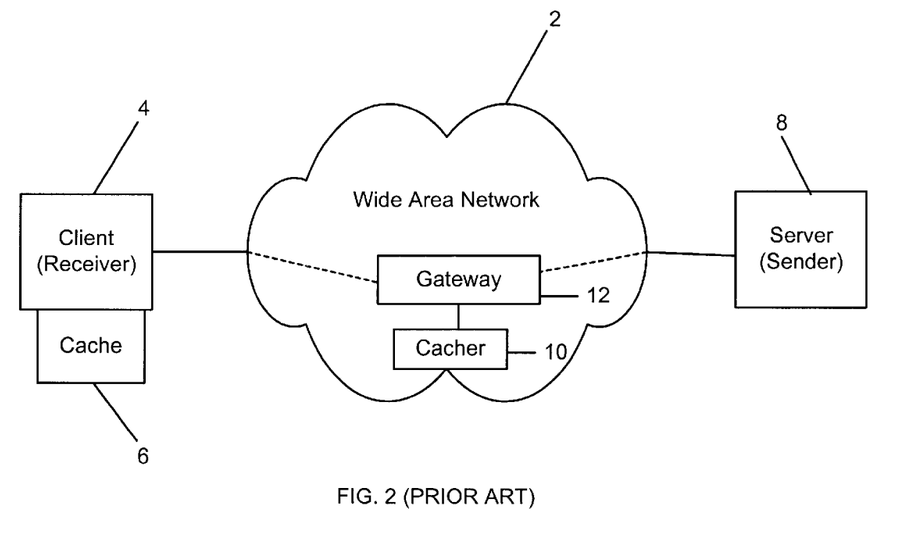
FIG. 2 illustrates a prior art wide-area network with a caching gateway.

Many known applications and protocols provide means for caching and verifying of data transmitted via a network 2 (FIG. 1, prior art). Thus, a client (receiver) 4 caches data received from network 2 in cache 6. Then, when data from a remote server (sender) 8 is requested, it first searches its local cache. If the requested data is available in the cache and is verified to be valid, the client uses it, and transmission over the network is not required. Gateway or proxy caches 10 (FIG. 2, prior art) are able to operate in a similar manner.

The most well-known techniques are as follows:
1) In response to a request from a receiver, a sender attaches to the sent data an expiration time in absolute or relative form. The receiver, and possibly proxies, cache the data together with its request until the expiration time. Then the data is retrieved from the cache. In some cases, the receiver guesses the expiration time.

The problem associated with this technique is that the data entity can be changed before the expiration time, and the receiver would use an obsolete version of the data without even knowing it. Also, when the time has expired, the data will be resent, even if it is up to date.

2) In response to a request from a receiver, the sender attaches a validator to the sent data. The validator changes at least every time the data changes; in many cases, system time is used as the validator. The receiver, and possibly proxies, cache the data together with its request. When making the next request for the same data to the same sender, the receiver includes the validator. The sender keeps track of the data and resends it only if it were changed.

The problems associated with this technique are:
a) Data is cached according to requests and senders. If the same request is directed to different servers, cached data cannot be reused.
b) Requests without concrete data cannot be cached.
c) The sender must track the cached data, which is not always possible.

None of the prior art techniques discussed above provides means for transmitting minor differences in data. Additionally, if data is retrieved through a caching proxy, there is a danger that an unauthorized user will have access to the data.

It is therefore a broad object of the present invention to provide a method, system and apparatus for increasing the speed of data access in a packet-switched network.

Another object of the present invention is to decrease data traffic throughout the network.

Still another object of the present invention is to decrease the required cache size.

A yet further object of the present invention is to maintain accessed data integrity and to improve security.

SUMMARY OF THE INVENTION

The terms "data" or "data object" as used herein refer to a file or range of octets in a file, a range of frames in a video stream or RAM-based range of octets, a transport level network packet, or the like.

The term "digital digest" as used herein refers to a fixed-size binary value calculated from arbitrary-size binary data in such a way that it depends only on the contents of the data and the low probability that two different data or objects have the same digital digest.

The term "gateway" as used herein also includes network proxies and routers.

If a sender/computer in a network is required to send data to another receiver/computer, and the receiver/computer has data with the same digital digest as that of the data to be sent, it can be assumed with sufficient probability for most practical applications that the receiver/computer has data which is exactly the same as the data to be sent. Then, the receiver/computer can use the data immediately without its actual transfer through the network. In the present invention, this idea is used in a variety of ways.

In one embodiment of the invention, a sender/computer required to send data to a receiver/computer computer initially sends a digital digest of the data. If the receiver/computer already has data with the same digital digest, it uses this data as if it were actually transmitted from the sender/computer. Additionally, digital digests for other data objects can be sent together with the principal digest. If the receiver/computer cannot find data having the principal digest, it searches for data with one of these auxiliary digests. If such data is found, the sender/computer is required to send only the difference between the requested data object and the data object corresponding to the digest.

The expression "difference between a first data or data object and a second data or data object" as used herein means any bit sequence that enables the restoration of the first data, given the second data, the bit sequence and the method employed in calculating the difference.

The invention may be implemented in a gateway system. Such a system comprises a gateway computer connected to a packet-switched network in such a way that network packets sent between at least two other computers pass through it; a caching computer connected to the gateway computer, the caching computer having a network cache memory in its permanent storage memory, means for calculating a digital digest on the data it stores and means for comparison between a digital digest calculated on data in its network cache memory and a digital digest received from the packet-switched network by the gateway computer. When this system intercepts an indication signal other than a positive indication signal for a certain digital digest from a receiver/computer computer, if it has data with the same digest, it sends this data to the receiver/computer.

In another embodiment of the present invention, a client computer sends to a server computer a request including digital digests. A sender/computer forming a response then searches for data with the same digital digests as those received. If the digest of the data in the response equals one of the received digests, the server only sends confirmation. If the digest of another data is identical to one of the received digests, only the difference(s) between these data is sent.

In accordance with the present invention, there is therefore provided a system for data access in a packet-switched network, comprising a sender/computer including an operating unit, a first memory, a permanent storage memory and a processor and a remote receiver/computer including an operating unit, a first memory, a permanent storage memory and a processor, said sender/computer and said receiver/computer communicating through said network; said sender/computer further including means for calculating digital digests on data; said receiver/computer further including a network cache memory and means for calculating digital digests on data in said network cache memory; and said receiver/computer and/or said sender/computer including means for comparison between digital digests.

The invention also provides a system for data access in a packet-switched network, comprising a gateway computer including an operating unit, a memory and a processor connected to said packet-switched network in such a way that network packets sent between at least two other computers pass through it; a caching computer including an operating unit, a first memory, a permanent storage memory and a processor connected to said gateway computer through a fast local network; said caching computer further including a network cache memory in its permanent storage memory, means for calculating a digital digest on data stored therein and means for comparison between a digital digest calculated on data in its network cache memory and a digital digest received from said packet-switched network through said gateway computer.

In addition, the invention provides a system for data access in a packet-switched network, comprising a sender/computer including an operating unit, a first memory, a permanent storage memory and a processor and a remote receiver/computer including an operating unit, a first memory, a permanent storage memory and a processor, said sender/computer and said receiver/computer communicating through a network; said sender/computer further including means for calculating digital digests on data, and said receiver/computer further including a network cache memory, means for storing a digital digest received from said network in its permanent storage memory and means for comparison between digital digests.

The invention further provides a method performed by a sender/computer in a packet-switched network for increasing data access, said sender/computer including an operating unit, a first memory, a permanent storage memory and a processor and said sender/computer being operative to transmit data to a receiver/computer, the method comprising the steps of transmitting a digital digest of said data from said sender/computer to said receiver/computer; receiving a response signal from said receiver/computer at said sender/computer, said response signal containing a positive, partial or negative indication signal for said digital digest, and if a negative indication signal is received, transmitting said data from said sender/computer to said receiver/computer.

The invention still further provides a method for increasing data access performed by a sender/computer in a packet-switched network, said sender/computer including an operating unit, a first memory, a permanent storage memory and a processor and said sender/computer being operative to transmit principal data to a receiver/computer, said method comprising the steps of transmitting digital digests of said principal data and of one or more auxiliary data from said sender/computer to said receiver/computer; receiving a response signal at said sender/computer from said receiver/computer, said response signal containing a positive, negative or partial indication signal, and if a partial indication signal is received, said sender/computer transmitting a signal constituting the difference between said principal data and corresponding auxiliary data.

The invention yet further provides a method for increased data access performed by a receiver/computer in a packet-switched network, said receiver/computer including an operating unit, a first memory, a permanent storage memory, a processor and a network cache memory, said method comprising the steps of receiving a message containing a digital digest from said network; searching for data with the same digital digest in said network cache memory, and if data having the same digital digest as the digital digest received is not uncovered, forming a negative indication signal and transmitting it back through said network.

Still further, the invention provides a method for increased data access performed by a receiver/computer in a packet-switched network, said receiver/computer including an operating unit, a first memory, a permanent storage memory, a processor and a network cache memory, said method comprising the steps of receiving a message containing a digital digest from said network; searching for data with the same digital digest in said network cache memory, and if data having the same digital digest as the digital digest received is uncovered, forming a positive indication signal and transmitting it back through said network.

In addition, the invention provides a method for increased data access performed by a receiver/computer in a packet-switched network, said receiver/computer including an operating unit, a first memory, a permanent storage memory, a processor and a network cache memory, said method comprising the steps of receiving a message containing a principal digital digest and one or more auxiliary digital digests from said network; searching in predetermined locations in said permanent storage memory for data with a digital digest substantially identical to said principal digital digest; searching in predetermined locations in said permanent storage memory for data with a digital digest substantially identical to one of said auxiliary digital digests; and if data having the same digital digest as one of said auxiliary digital digests received is uncovered, forming a partial indication signal and transmitting it back through said network.

Yet further, the invention provides a method for increased data access performed by a computer system in a packet-switched network, said computer system including a network cache memory and being operationally interposed between a sender/computer and a receiver/computer so that data packets sent between said sender/computer and said receiver/computer are delivered through said computer system; said method comprising the steps of intercepting a message containing a digital digest transmitted from said sender/computer to said receiver/computer, and transmitting data with a digital digest substantially identical to the digital digest received from said sender/computer to said receiver/computer.

In addition, the invention provides a method for increased data access performed by a computer system in a packet-switched network, said computer system including a network cache memory and being operationally interposed between a sender/computer and a receiver/computer so that data packets sent between said sender/computer and said receiver/computer are delivered through said computer system; said method comprising the steps of intercepting a message containing a digital digest transmitted from said sender/computer to said receiver/computer; intercepting a message containing an indication signal other than a positive indication signal transmitted from said receiver/computer to said sender/computer in response to said message containing a digital digest, and transmitting data with a digital digest substantially identical to the digital digest received from said sender/computer to said receiver/computer.

Additionally, the invention provides a method for increased data access performed by a client computer in a packet-switched network, said client computer including an operating unit, a first memory and a processor, said method comprising the steps of sending a request for data from said client computer to a server, said request containing digital digests for different data; said server preparing a response to said request, searching for data with a digital digest substantially identical to one of the digital digests received in said request, and producing the difference between said response and the uncovered data.

Finally, the invention provides apparatus for increased data access in a packet-switched network, comprising a computer connected to said packet-switched network, including an operating unit, a first memory, a permanent storage memory, a processor and a network cache memory; means for calculating digital digests of data in said network cache memory; means for comparison between digital digests, and means for sending the results of comparison between a digital digest received from another computer in said network and a digital digest calculated on data in said network cache memory back to said other computer.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

The performance gains realized by the present invention are derived from the fact that computers in common wide-area networks tend to repetitively transmit the same data over the network.

The operations described herein may take the form of electrical or optical signals. The packet-switched network may be Internet.

The term "digital digest" as used herein refers to the per se known MD5 algorithm, described in RFC 1321 by R. Rivest, which is a preferred calculation method. Other algorithms may, however, just as well be used. For example, a digital digest may be calculated according to the CRC algorithm, or by applying the CRC algorithm to different subsets or different reorderings of data, or by consecutively applying CRC and MD5. In addition, any other algorithm may be used, provided that it produces a fixed-size binary value calculated from arbitrarily-sized binary data in such a way that it depends only on the contents of said data and that the probability of two different data having the same digital digest, is low.

Figure 3:
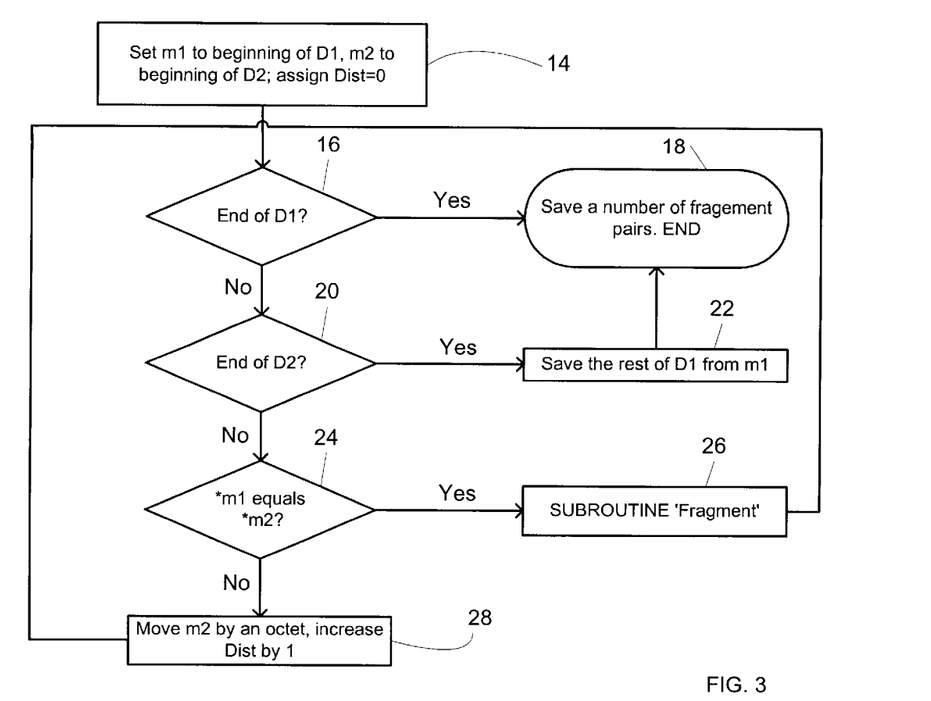
FIG. 3 is a flow diagram of the method of calculating the difference between two data digests according to the present invention.

Whenever means for calculating the difference between two data are mentioned herein, the method as shown in FIG. 3 may be employed. The data are referred to as D1 and D2. The difference between them consists of three parts: the number of fragment pairs, the array of fragment pairs, and the remainder of D1. A fragment pair is a pair representing the distance from the beginning of this fragment to the end of the previous one, and the number of octets in the fragment (Dist,Length). A marker m1 is set at the beginning of the data D1 and a marker m2 at the beginning of D2.

An octet m1 is designated as *m1 and an octet m2 as *m2. An integer K>1, which represents a minimal length of a fragment encoded, e.g., K=3, is chosen.

As stated above, m1 is set at the beginning of D1, m2 at the beginning of D2, and Dist=0 is assigned at 14. A loop is then entered: if m1 is at the end of D1 (16), a number of fragment pairs is saved at 18, and the algorithm is completed. If m2 is at the end of D2 (20), the rest of D1 from m1 is saved at 22, a number of fragment pairs is saved, and the algorithm is completed. If *m1 equals *m2 (24), a subroutine "Fragment" is entered at 26; otherwise, m2 is moved by one octet toward the end of D2 and Dist is increased by 1 at 28.

The subroutine "Fragment" proceeds as follows: New markers t1=m1 and t2=m2 are set and Length=0 is assigned at 30. t1 and t2 are moved by an octet toward the ends of D1 and D2 and Length is increased at 32. If t1 is at the end of D1, or t2 is at the end of D2, or *t1 does not equal *t2 at the end of the fragment (34), then the Length is a length of the fragment and Dist is the distance between the beginning of this fragment and the end of the previous one. If the Length <K as determined by 36, the fragment is dropped at 38, m2 is moved by one octet and the subroutine is terminated. Otherwise, the pair (Dist,Length) is saved, the number of pairs is increased by one, m1 and m2 are moved by Length octets toward the ends of D1 and D2, and Dist is reset to 0 at 40. The subroutine is ended.

The sequence of fragment pairs may be further reduced in size by using the per se known Huffman encoding or by using an arithmetic coding, e.g., as disclosed in U.S. Pat. No. 4,122,440.

Figure 4:
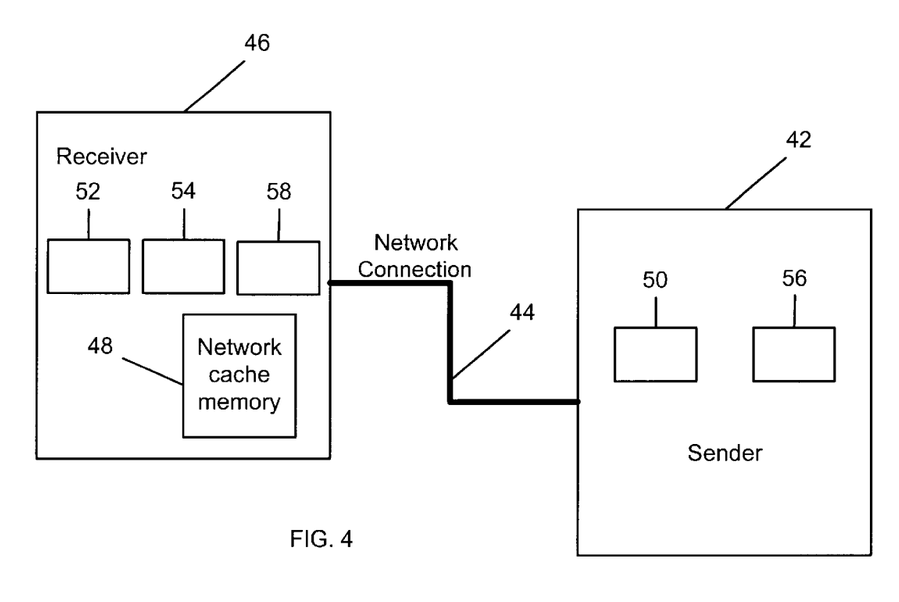
FIG. 4 is a block diagram of a first embodiment of a sender/computer-receiver/computer system according to the present invention.

Restoration of the data is simple. Marker m2 is set at the beginning of the known D2. Then for each fragment pair (Dist, Length) from the known difference, m2 is moved by Dist octets, Length octets are copied from m2 to D1 and m2 is moved by Length. Then the rest of D1 is copied from the remainder An embodiment of a sender/computer-receiver/computer system according to the present invention is schematically illustrated in FIG. 4. A preferred embodiment is a network computer system having at least two computers. A sender/computer 42 (also referred to herein as "sender/computer") having an operating unit, a first memory, a permanent storage memory and a processor, is connected to the network by any network connection 44. A remote receiver/computer 46 (also referred to herein as "receiver/computer") having an operating unit, a first memory, a permanent storage memory and a processor, is also connected to the network. The receiver/computer 46 uses a part of its permanent storage memory or its first memory, or both, as network cache memory 48. The sender/computer has calculation means 50 for calculating a digital digest on data in its first memory or in its permanent storage memory. Similarly, the receiver/computer has calculating means 52 for calculating a digital digest on data stored in its network cache memory 48. The receiver/computer also has comparison means 54 for comparing between such a calculated digital digest and a digital digest received from the network.

An example of a first memory could be a RAM; an example of a permanent storage memory may be a disk drive, a flash RAM or a bubble memory.

It is possible to modify this system in different ways. The receiver/computer 46 and sender/computer 42 may each include means for storing the calculated digital digest in its first memory or permanent storage memory. Additionally, the receiver/computer 46 may have means for calculating a digital digest on data in its permanent storage memory outside of its cache memory. Furthermore, the system may be modified in such a way that the sender/computer 42 has means 56 for calculating the difference between two data objects.

Figure 5:
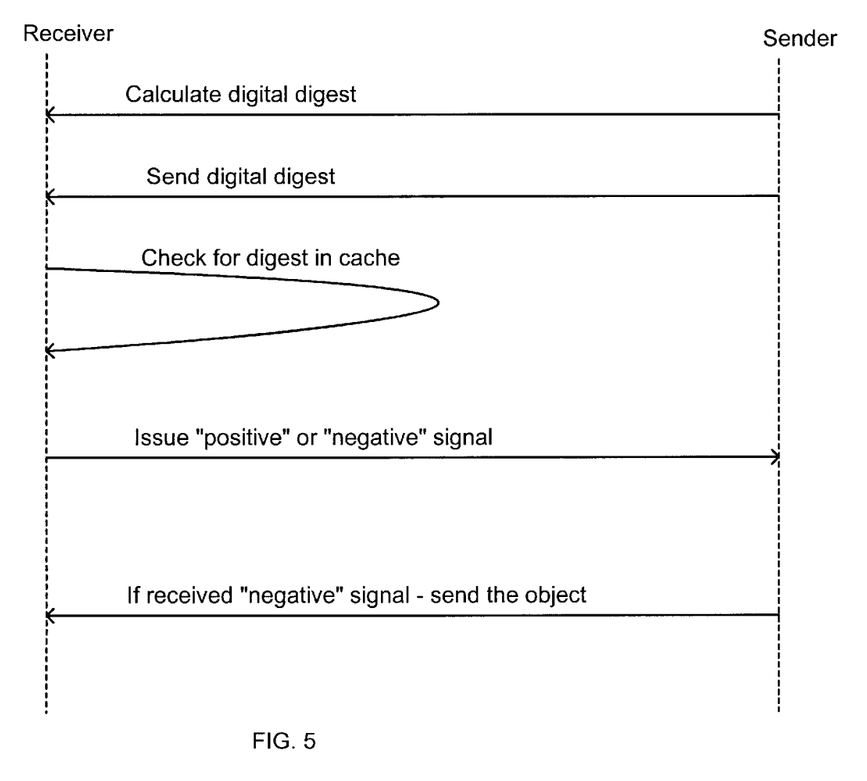
FIG. 5 is a schematic representation illustrating the interaction between a sender/computer and a receiver/computer according to the system of FIG. 4.
Figure 6:
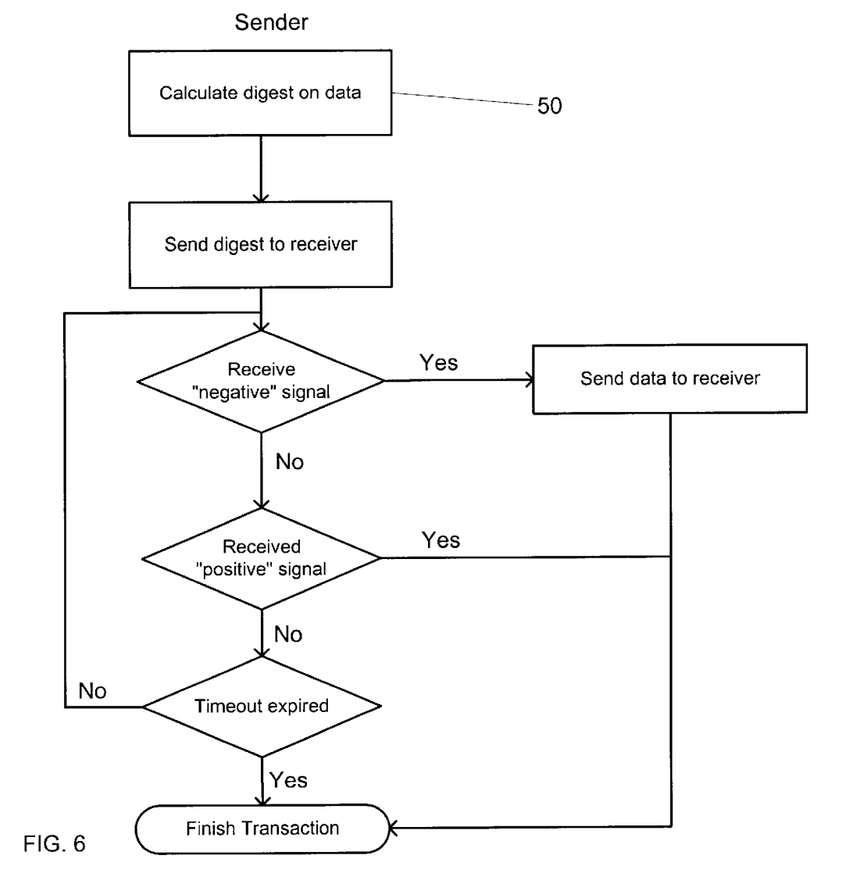
FIG. 6 is a flow diagram illustrating the method of operating the sender/computer according to the present invention.
Figure 7:
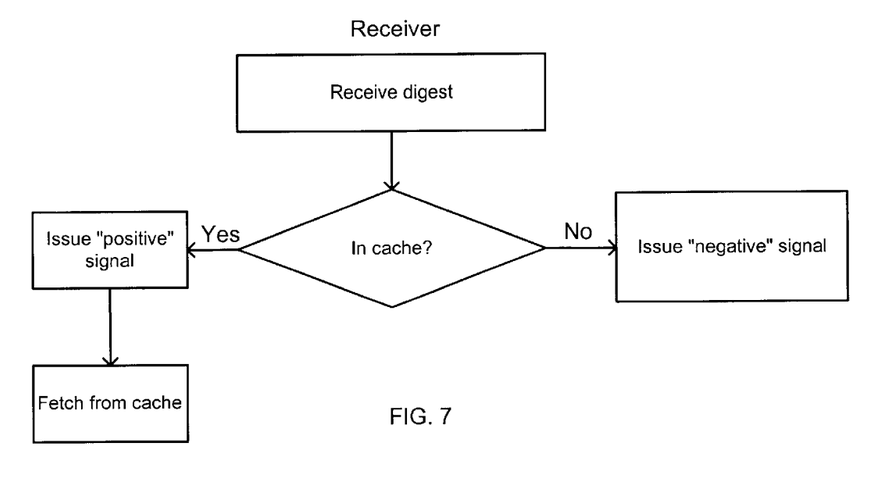
FIG. 7 is a flow diagram illustrating the method of operating the receiver/computer according to the present invention.

Interaction between the receiver/computer and the sender/computer is depicted in FIGS. 5 to 7. The data sender/computer 42 calculates a digital digest on the data in means 50 and then transmits the calculated digest to receiver/computer 46. The receiver/computer receives the digital digest from sender/computer 42 and then searches its network cache memory 48 for data with the same digest. If it finds such data, it uses it as if it were received from the sender/computer 42 and issues a positive indication signal to the sender/computer. Otherwise, it sends a negative indication signal to the sender/computer. Upon receiving a negative indication signal, the sender/computer transmits the data. Upon receiving a positive indication signal, or upon expiration of a predefined period of time, the sender/computer completes the transaction. This transaction begins with a receiver/computer sending a request to the sender/computer.

The above-described method may be modified in different ways. For example, absence of a signal from the receiver/computer for a predetermined period of time may be considered by the sender/computer to be a negative indication signal. Alternatively, the digital digests for some data may be stored in the permanent storage memory of the sender/computer and obtained from there, or a plurality of data may be processed in one transaction, a digital digest being calculated for each data object and a separate indication signal issued on each digital digest.

Figure 8:
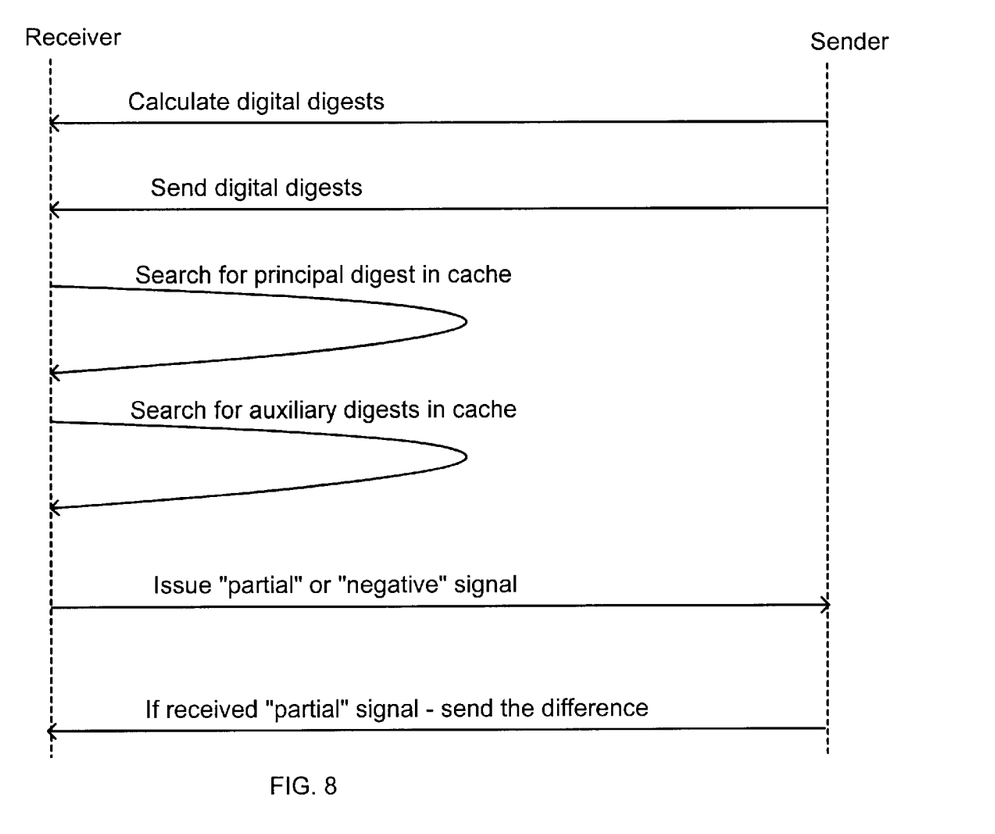
FIG. 8 is a schematic representation illustrating the interaction between a sender/computer and a receiver/computer according to another embodiment of the present invention.
Figure 9:
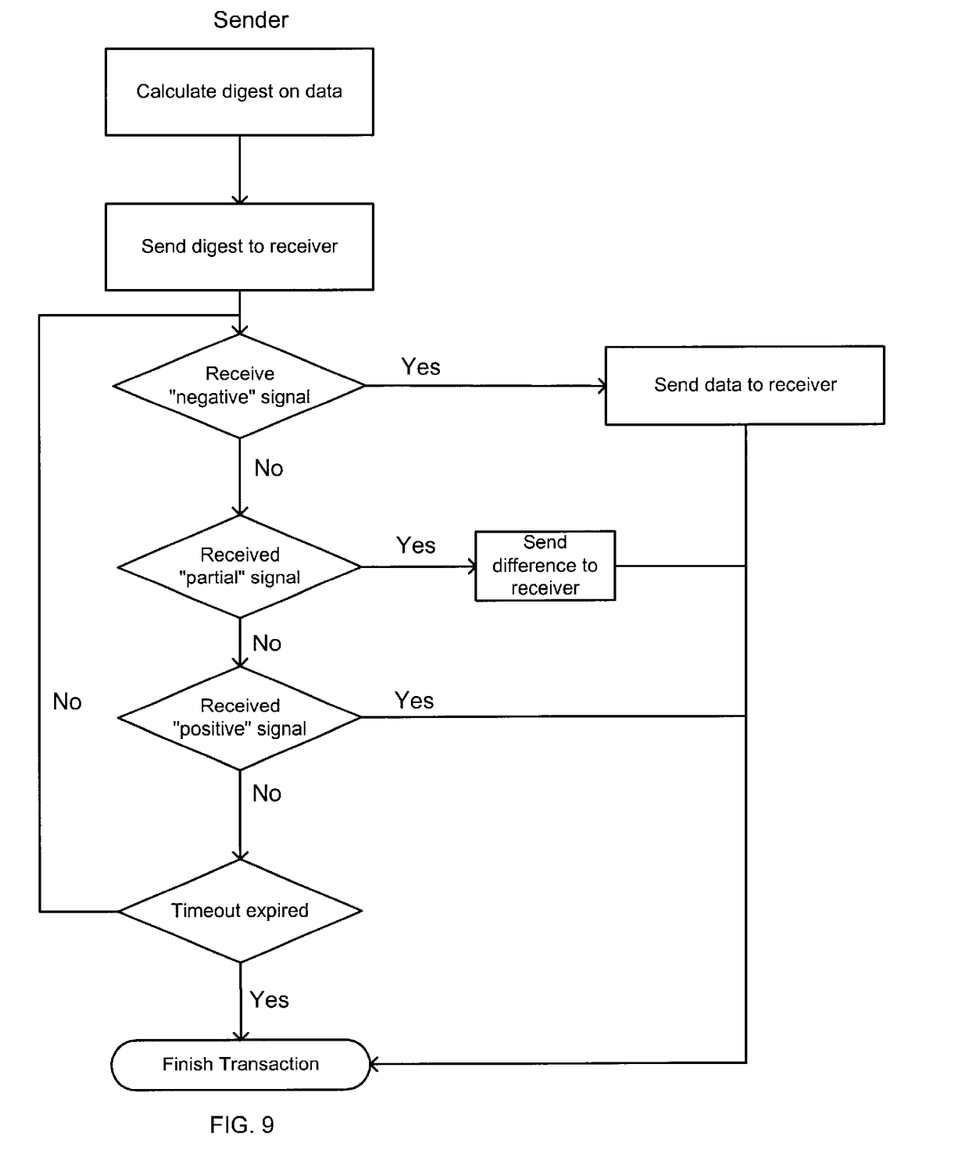
FIG. 9 is a flow diagram illustrating the method of operating the sender/computer according to a further embodiment of the present invention.
Figure 10:
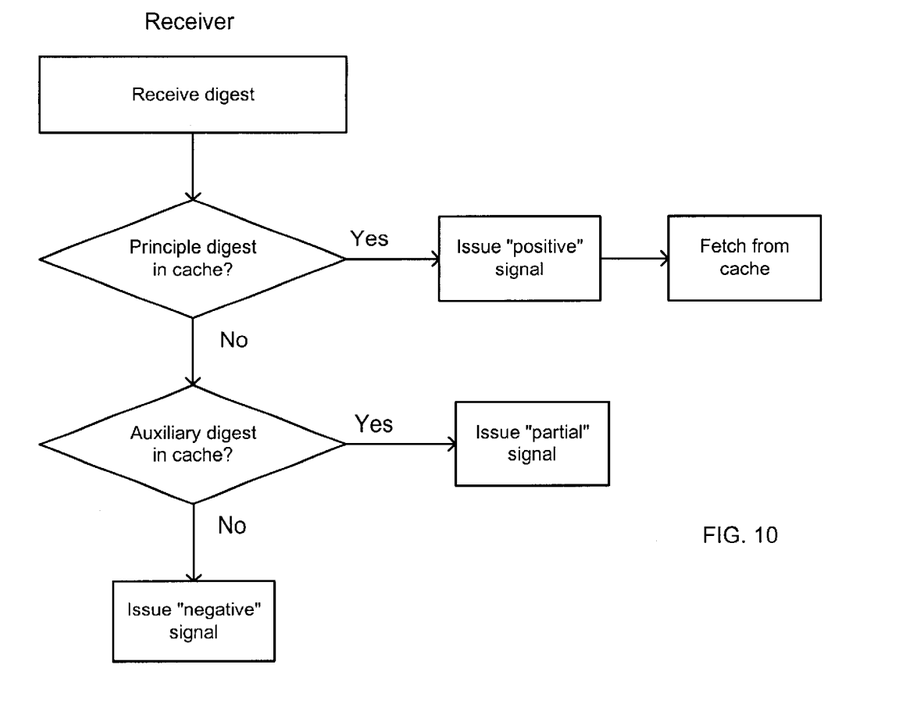
FIG. 10 is a flow diagram illustrating the method of operating the receiver/computer according to the embodiment of FIG. 9.

Another method of interaction between the receiver/computer 46 and the sender/computer 42 is illustrated in FIGS. 8–10. The data sender/computer calculates a digital digest on the data to be sent (hereinafter, "principal digest") and for one or more other data objects (hereinafter, "auxiliary digests"). Without limiting the scope of the invention, the following data objects may be recommended: (a) a previous version of the data requested; (b) a file similar to the data requested. Then the sender/computer sends the principal and auxiliary digests to the receiver/computer. Upon receiving a message with these digital digests from the sender/computer, the receiver/computer searches its network cache memory 48 for data having the principal digest. If such data is found, it uses it as if it were received from sender/computer 42 and issues a positive indication signal to the sender/computer. Otherwise, receiver/computer 46 searches its network cache memory 48 for data with the auxiliary digests. If it finds data with a digital digest substantially equal to one of the auxiliary digests, it issues a partial indication signal to the sender/computer, with a reference to the digest. Otherwise, it issues a negative indication signal to the sender/computer. Upon receiving a negative indication signal, the sender/computer sends the data. Upon receiving a partial indication signal, the sender/computer transmits the difference between the digital digest of the data required to be sent and that of the data whose digital digest was found by the receiver/computer. This transaction may also begin with the receiver/computer sending a request to the sender/computer.

A modification of the above method is possible. For example, absence of the indication signal from the receiver/computer for a predefined period of time may be considered by the sender/computer as a negative indication signal, or the digital digests for some data may be stored in the permanent storage memory of the sender/computer and obtained from there instead of being calculated immediately before the transaction. Alternatively, a plurality of data may be processed in one transaction; a digital digest is calculated for each data object and a separate indication signal issued on every digital digest. Still alternatively, receiver/computer 46 may search not only in its network cache memory 48, but also in predefined locations in its permanent storage memory. Sender/computer 42 may add to a digest it sends to the receiver/computer information about the possible location of the data with that digital digest in the receiver/computer's permanent storage memory.

Figure 11:
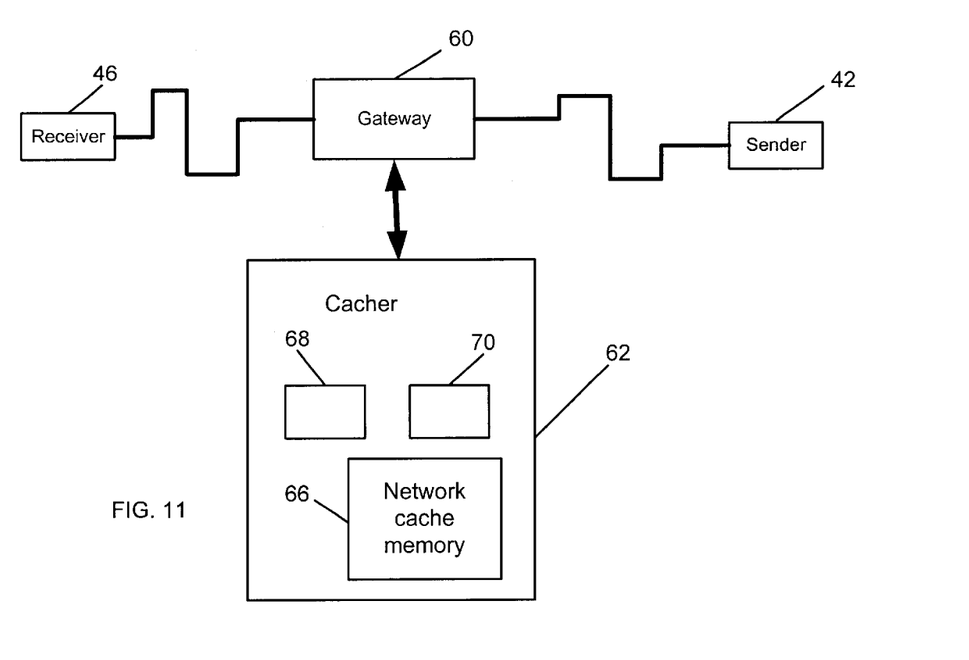
FIG. 11 is a block diagram of the configuration of the gateway system according to the present invention.

Another embodiment of the present invention is schematically illustrated in FIG. 11. Shown is a system comprising a gateway computer or gateway 60 including an operating unit, a first memory and a processor, and a caching computer 62 including an operating unit, a first memory, a permanent storage memory and a processor, connected to the gateway 60 through any fast network connection 64, e.g., Ethernet. Gateway 60 is connected to a wide-area packet-switched network in such a way that network packets sent between at least two other computers 42 and 46 pass through the gateway 60. The caching computer 62 uses a part of its permanent storage memory for network cache memory 66. Caching computer 62 has means 68 for calculating the digital digest of data in its network cache memory 66, and means 70 for comparison between such a calculated digital digest and a digital digest received by gateway computer 60 from the wide-area network. It should be noted that gateway computer 60 may be integrally formed with the caching computer. The caching computer may have means for storing a calculated digital digest in its first memory or permanent storage memory.

Figure 12:
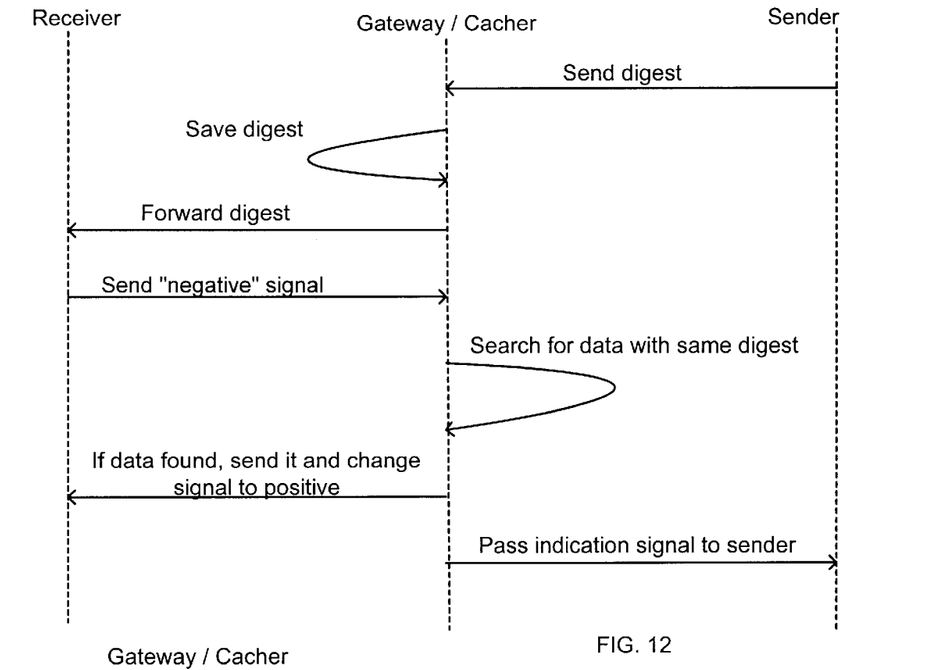
FIG. 12 is a schematic representation of the interaction between a sender/computer, a receiver/computer, and the gateway configuration according to the present invention.
Figure 13:
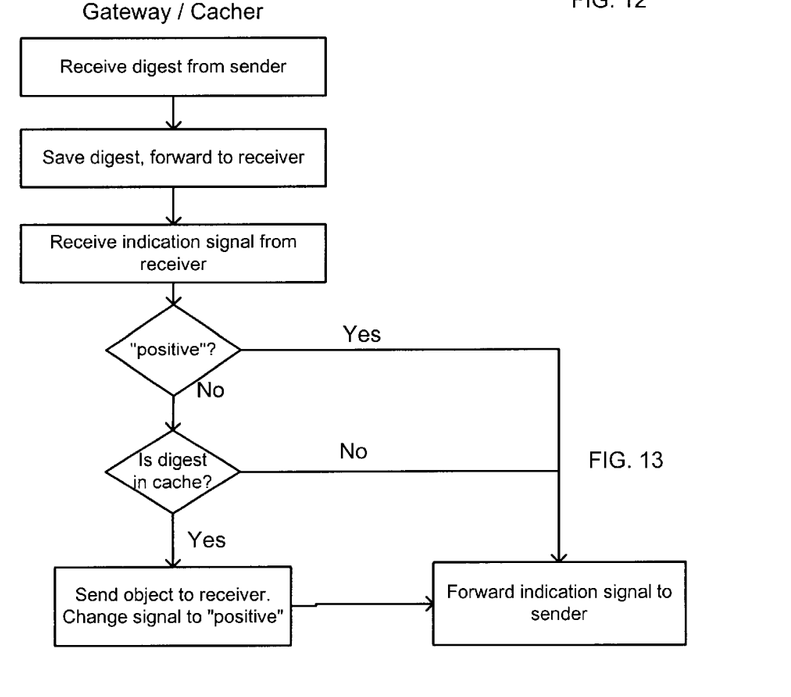
FIG. 13 is a flow diagram of the operation of the gateway.

By way of example, operations which may be performed in such a system will now be described with reference to FIGS. 12 and 13. The gateway 60, operationally interposed between a sender/computer 42 and a receiver/computer 46, intercepts a digital digest sent from the sender/computer to the receiver/computer, saves it in its memory, and passes it unchanged to the receiver/computer 46. Then the gateway 60 intercepts an indication signal other than a positive indication signal issued by the receiver/computer. If there was a digest for this indication signal, the caching computer 62 searches for data with the same digital digest in its network cache memory 66. If that digest is found, then the gateway sends the data to the receiver/computer, changes the indication signal to positive, and then passes the indication signal to sender/computer 42.

Further, the caching computer 62 may verify a digital digest for a data object stored in its network cache memory 66 by calculating the digital digest for that data and comparing it to the digest stored in the network cache memory. The calculated digital digest may be stored in the network cache memory 66 and the data object-digital digest pair may be marked as not requiring further verification.

Figure 14:
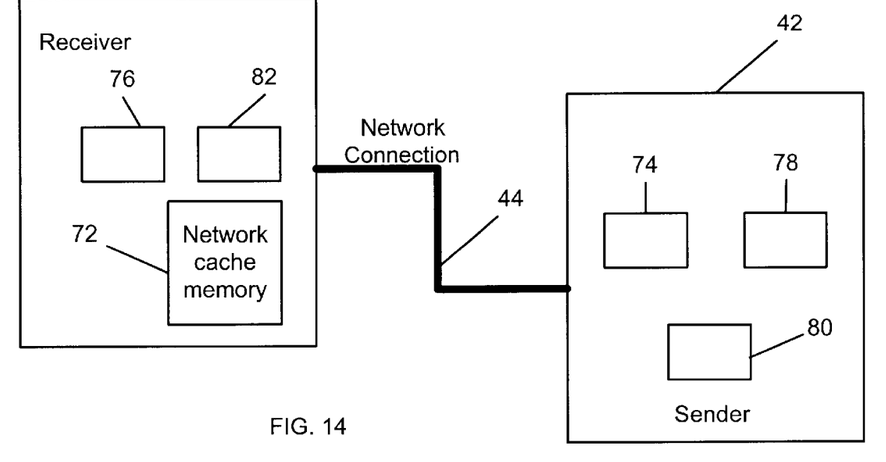
FIG. 14 is a block diagram of a further configuration of a sender/computer-receiver/computer system according to the present invention.

Another further embodiment of the present invention is schematically illustrated in FIG. 14. It consists of a network computer system comprising at least two computers: a sender/computer 42 including an operating unit, a first memory, a permanent storage memory and a processor which is connected to a network 44. A remote receiver/computer 46 having an operating unit, a first memory, a permanent storage memory and a processor is also connected to the network. The receiver/computer uses a part of its permanent storage memory or its first memory, or both, for network cache memory 72. The sender/computer 42 has means 74 for calculating a digital digest for data in its memory or in its permanent storage. The receiver/computer 46 has means 76 for calculating a digital digest for data stored in its network cache memory. The sender/computer 42 also has means 78 for comparison between such a calculated digital digest and a digital digest received from the network. The sender/computer further includes means 80 for calculating the difference between two data objects, and receiver/computer 46 includes means 82 for restoring a data object from another data object and the difference between said data object being restored and said another data object.

Figure 15:
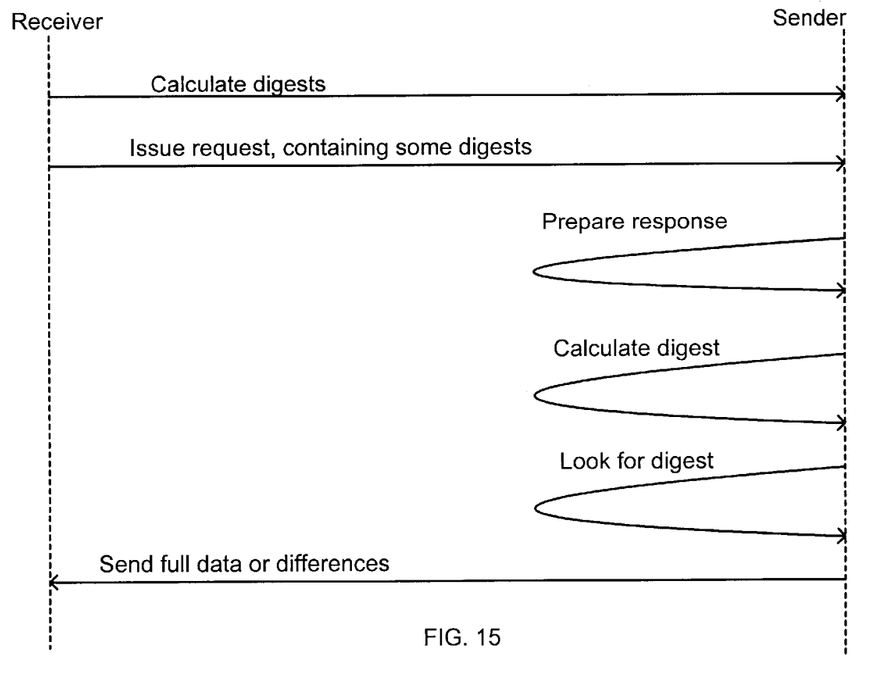
FIG. 15 is a schematic representation of the interaction between the sender/computer-receiver/computer system of FIG. 14.

An interaction between the sender/computer and receiver/computer according to this system is illustrated in FIG. 15. When receiver/computer 46 is required to request data from the server or sender/computer 42, it calculates one or more digital digests for different data objects stored in its network cache memory 72 or in its permanent storage memory. Without limiting the scope of the invention, the following data objects may be recommended: (a) a previous version of the data requested; (b) a file similar to the data requested; (c) a data set similar to the data requested, which may be generated in a first memory; (d) a large data file or database including fragments of octets, similar to the data requested. The receiver/computer then transmits a request for data, containing one or more of the above-mentioned digital digests. The sender/computer prepares a response to the request, and then calculates a digital digest on the data in the response. If the calculated digest is equal to one of the digital digests in the request, the sender/computer sends a confirmation. Otherwise, the sender/computer may continue searching for the data objects with the same digital digests in the predefined subset of its permanent storage memory. If it finds such data, it calculates the difference between this data and the data in the response, and sends only the difference. Otherwise, the sender/computer sends the response as prepared.

Variations of the above method are envisioned. For example, a number of requests for data may be sent simultaneously. The digital digests on the receiver/computer may be calculated earlier and stored in the permanent memory of the receiver/computer. The digital digests on the sender/computer may also be calculated earlier and stored in the permanent memory of the sender/computer.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for data access in a packet-switched network, comprising:

a sender/computer including an operating unit, a first memory, a permanent storage memory and a processor and a remote receiver/computer including an operating unit, a first memory, a permanent storage memory and a processor, said sender/computer and said receiver/computer communicating through said network;

said sender/computer further including means for creating digital digests on data;

said receiver/computer further including a network cache memory and means for creating digital digests on data in said network cache memory; and said receiver/computer including means for comparison between digital digests.

2. The system as claimed in claim 1, wherein said receiver/computer further includes means for a digital digest for data stored in said permanent storage memory.

3. The system as claimed in claim 1, wherein said receiver/computer further includes means for storing said created digital digest in its first or permanent memory.

4. The system as claimed in claim 1, wherein said sender/computer further includes means for the difference between two data objects and said receiver/computer further includes means for restoring a data object from another data object and the difference between said data object being restored and said another data object.

5. The system as claimed in claim 1, wherein said sender/computer further includes means for the difference between two data objects and said receiver/computer further includes means for restoring a data object from another data object and the difference between said data object being restored and said another data object.

6. A system for data access in a packet-switched network, comprising:

a gateway including an operating unit, a memory and a processor connected to said packet-switched network in such a way that network packets sent between at least two other computers pass through it;

a caching computer connected to said gateway through a fast local network, wherein said caching computer includes an operating unit, a first memory, a permanent storage memory and a processor;

said caching computer further including a network cache memory in its permanent storage memory, means for a digital digest and means for comparison between a digital digest on data in its network cache memory and a digital digest received from said packet-switched network through said gateway.

7. The system as claimed in claim 6, wherein said caching computer further includes means for a digital digest for data in its network cache memory.

8. The system as claimed in claim 6, wherein said caching computer is integrally formed with said gateway.

9. The system as claimed in claim 6, wherein said caching computer further includes means for storing said digital digest in said permanent storage memory.

10. A system for data access in a packet-switched network, comprising:

a sender/computer including an operating unit, a first memory, a permanent storage memory and a processor and a remote receiver/computer including an operating unit, a first memory, a permanent storage memory and a processor, said sender/computer and said receiver/computer communicating through a network;

said sender/computer further including means for creating digital digests on data, and said receiver/computer further including a network cache memory, means for storing a digital digest received from said network in its permanent storage memory and means for comparison between digital digests.

11. A method performed by a sender/computer in a packet-switched network for increasing data access, said sender/computer including an operating unit, a first memory, a permanent storage memory and a processor and said sender/computer being operative to transmit data to a receiver/computer, the method comprising the steps of:

creating and transmitting a digital digest of said data from said sender/computer to said receiver/computer;

receiving a response signal from said receiver/computer at said sender/computer, said response signal containing a positive, partial or negative indication signal for said digital digest, and if a negative indication signal is received, transmitting said data from said sender/computer to said receiver/computer.

12. The method as claimed in claim 11, wherein said sender/computer creates said digital digest for the data before transmitting it to said receiver/computer.

13. The method as claimed in claim 12, wherein said sender/computer transmits the data to said receiver/computer after a preset period of time has passed since transmitting said digital digest to said receiver/computer and a response signal has not been received.

14. The method as claimed in claim 12, wherein, when a plurality of data objects is to be sent, a digital digest is sent for each of said data objects and a response signal is sent containing a separate indication signal for each of said data objects.

15. The method as claimed in claim 12, wherein said digital digest creation comprises the step of Cyclic Redundancy Check against the contents of the data.

16. The method as claimed in claim 12, wherein said digital digest creation comprises the step of MD5 against the contents of the data.

17. A method for increasing data access performed by a sender/computer in a packet-switched network, said sender/computer including an operating unit, a first memory, a permanent storage memory and a processor and said sender/computer being operative to transmit principal data to a receiver/computer, said method comprising the steps of:

creating and transmitting digital digests of said principal data and of one or more auxiliary data from said sender/computer to said receiver/computer;

receiving a response signal at said sender/computer from said receiver/computer, said response signal containing a positive, negative or partial indication signal, and if a partial indication signal is received, said sender/computer transmitting a signal constituting the difference between said principal data and corresponding auxiliary data.

18. The method as claimed in claim 17, wherein additional information about the probable location of auxiliary data in said permanent storage memory of the receiver/computer is encoded and transmitted together with the corresponding digital digest.

19. The method as claimed in claim 17, wherein said sender/computer creates said digital digest for data before transmitting said digital digest to said receiver/computer.

20. The method as claimed in claim 17, wherein said digital digest is obtained from the permanent storage memory of said sender/computer.

21. The method as claimed in claim 17, wherein said digital digest creation comprises the step of Cyclic Redundancy Check against the contents of the data.

22. A method for increased data access performed by a receiver/computer in a packet-switched network, said receiver/computer including an operating unit, a first memory, a permanent storage memory, a processor and a network cache memory, said method comprising the steps of:

receiving a message containing a digital digest from said network;

searching for data with the same digital digest in said network cache memory, if data having the same digital digest as the digital digest received is not uncovered, forming a negative indication signal and transmitting it back through said network; and creating a digital digest for data received from said network cache memory.

23. The method as claimed in claim 22, further comprising searching in predetermined locations in said permanent storage memory for data with a digital digest substantially identical to the digital digest received from said network.

24. The method as claimed in claim 22, wherein a plurality of digital digests for different data objects is received in the same message and an indication signal is generated separately for each of said data objects.

25. A method for increased data access performed by a receiver/computer in a packet-switched network, said receiver/computer including an operating unit, a first memory, a permanent storage memory, a processor and a network cache memory, said method comprising the steps of:

receiving a message containing a principal digital digest and one or more auxiliary digital digests from said network, wherein said auxiliary digital digests are correlated to data objects similar to the data object represented by said principal digest;

searching in predetermined locations in said permanent storage memory for data with a digital digest substantially identical to said principal digital digest;

searching in predetermined locations in said permanent storage memory for data with a digital digest substantially identical to one of said auxiliary digital digests; and if data having the same digital digest as one of said auxiliary digital digests received is uncovered, forming a partial indication signal and transmitting it back through said network.

26. The method as claimed in claim 25, further comprising the step of searching the network cache memory for data with said principal digital digest.

27. The method as claimed in claim 26, further comprising the step of searching in said network cache memory for data with one of said auxiliary digital digests.

28. A method for increased data access performed by a computer system in a packet-switched network, said computer system including a network cache memory and being operationally interposed between a sender/computer and receiver/computer so that data packets sent between said sender/computer and said receiver/computer are delivered through said computer system; said method comprising the steps of:

intercepting a message containing a digital digest transmitted from said sender/computer to said receiver/computer, and transmitting data with a digital digest substantially identical to the digital digest received from said sender/computer to said receiver/computer in response to said message, whereby said sender/computer is relieved of the burden of transmitting said data.

29. The method of claim 28 further comprising the step of receiving said data into the network cache memory prior to intercepting the message.

30. A method for increased data access performed by a computer system in a packet-switched network, said computer system including a network cache memory and being operationally interposed between a sender/computer and a receiver/computer so that data packets sent between said sender/computer and said receiver/computer are delivered through said computer system; said method comprising the steps of:

intercepting a message containing a digital digest transmitted from said sender/computer to said receiver/computer;

intercepting a message containing an indication signal other than a positive indication signal transmitted from said receiver/computer to said sender/computer in response to said message containing a digital digest, and transmitting data with a digital digest substantially identical to the digital digest received from said sender/computer to said receiver/computer, whereby said sender/computer is relieved of the burden of transmitting said data.

31. The method of claim 30 further comprising the step of receiving said data into the network cache memory prior to intercepting the message.

32. A method for increased data access performed by a client computer in a packet-switched network, said client computer including an operating unit, a first memory and a processor, said method comprising the steps of:

sending a request for a single first data object from said client computer to a server, said request containing multiple digital digests for different data objects similar to said first data object;

said server preparing a response to said request, searching for a second data object with a digital digest substantially identical to one of the digital digests received in said request, and producing the difference between said first data object and the uncovered second data object.

33. The method as claimed in claim 32, further comprising the step of transmitting said difference to said client computer.

34. The method as claimed in claim 33, further comprising the step of using said difference for restoring the data from said response in said client computer.

* * * * *

UNITED STATES PATENT AND TRADEMARK OFFICE
CERTIFICATE OF CORRECTION

PATENT NO. : 6,757,717 B1  
APPLICATION NO. : 09/398007  
DATED : June 29, 2004  
INVENTOR(S) : Leonid Goldstein Page 1 of 1

It is certified that error appears in the above-identified patent and that said Letters Patent is hereby corrected as shown below:

Col. 10: line 47: Insert --calculating-- between "for" and "a"

Col. 10: line 53: Insert --calculating-- between "for" and "a"

Col. 11: line 08: Insert --calculating-- between "for" and "a"

Col. 11: line 14: Insert --calculating-- between "for" and "a"

Col. 11: line 19: Insert --calculated-- between "said" and "digital"

Col. 11: line 66: Insert --calculation-- between "MD5" and "against"

Signed and Sealed this

Fourteenth Day of August, 2012

David J. Kappos  
*Director of the United States Patent and Trademark Office*